United States Patent [19]

Castoe

[11] Patent Number: 4,581,802
[45] Date of Patent: Apr. 15, 1986

[54] CASTER ADJUSTMENT TOOL

[76] Inventor: John H. Castoe, 10234 McVine St., Sunland, Calif. 91040

[21] Appl. No.: 704,297

[22] Filed: Feb. 22, 1985

[51] Int. Cl.⁴ .......................... B21C 1/00; B21J 13/08
[52] U.S. Cl. .................................. 29/402.19; 72/704; 72/458; 81/488
[58] Field of Search ................ 29/402.01, 401, 402.03, 29/402.09, 402.11, 402.12, 402.14, 402.19, 402.21, 402.02, 402.04, 402.05, 402.06, 402.07, 402.08, 402.13, 402.15, 402.16, 402.17, 402.18; 72/704, 458

[56] References Cited

U.S. PATENT DOCUMENTS

| | | | |
|---|---|---|---|
| 3,807,693 | 4/1974 | Castoe | 72/704 |
| 4,424,697 | 1/1984 | Carver | 72/704 |
| 4,490,897 | 1/1985 | Forre | 29/402.08 |

FOREIGN PATENT DOCUMENTS 1000663  1/1957  Fed. Rep. of Germany ........ 72/458

Primary Examiner—Howard N. Goldberg
Assistant Examiner—Vernon K. Rising
Attorney, Agent, or Firm—Christie, Parker & Hale

[57] ABSTRACT

A caster adjustment tool is used to adjust the caster angle on a McPherson front end suspension system having a strut arm connected to an upper bearing assembly which, in turn, is adjustably connected to a strut mounting plate affixed to the frame of a vehicle. The upper end of the strut arm is connected to the bearing assembly by a strut fastener exposed in an opening in the strut mounting plate. The caster adjustment tool includes a ring for fitting around the upper strut fastener, a lever arm, and a force arm of adjustable length extending between the ring and a lower portion of the lever arm. The force arm pivots on the lower portion of the lever arm. A connector on the lever arm below the pivot engages an edge of the strut mounting plate as the ring fits around the strut fastener. Fasteners connecting the strut bearing assembly to the strut mounting plate are loosened prior to the caster angle adjustment, and the lever arm is then forced to pivot its lower end against the rigid mounting plate which causes the force arm and the ring to move progressively toward the strut fastener to apply a sideways adjustment force to the upper strut bearing assembly to move the strut through an angle to adjust the caster setting. The caster adjustment tool can be used in the same way from either side of the strut bearing assembly to adjust either positive or negative caster angle.

5 Claims, 7 Drawing Figures

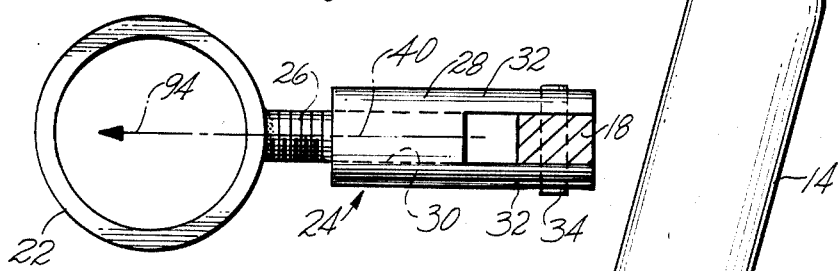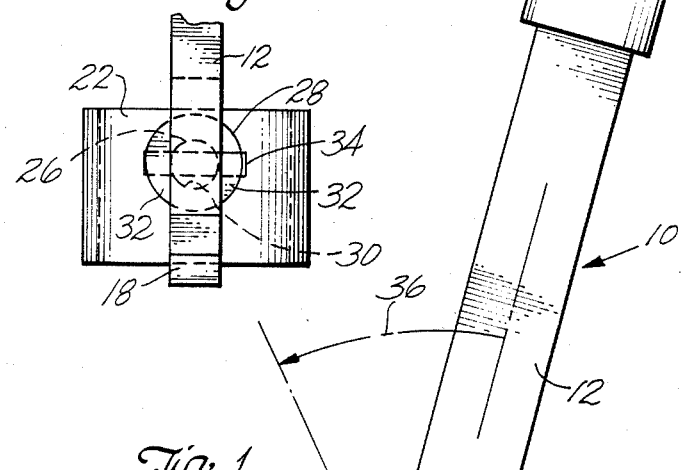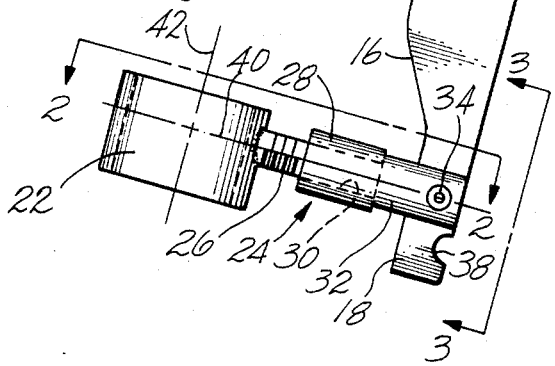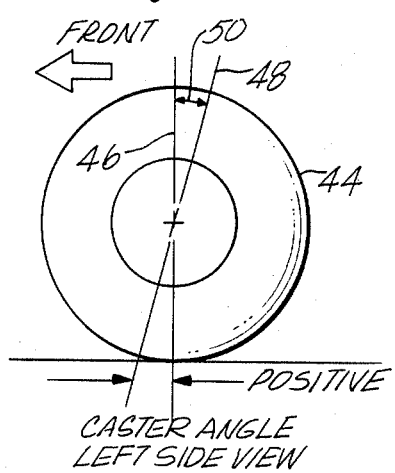

CASTER ADJUSTMENT TOOL

FIELD OF THE INVENTION

This invention relates in general to vehicle repair equipment, and more particularly to a device used for adjusting the wheel caster of a vehicle front end suspension system.

BACKGROUND OF THE INVENTION

A number of automobiles today have McPherson front end suspension systems. These suspension systems are characterized by a McPherson strut that provides both suspension and shock absorbing functions. The strut is susceptible to being bent upon impact of the wheel which can upset the desired wheel caster angle setting, not to mention toe-in and camber settings.

McPherson suspension systems over the years have been adopted primarily in foreign automobiles, but in recent years American automobiles have begun using the McPherson strut system. One example is the 1985 Cadillac, Buick and Oldsmobile front wheel drive automobiles. On many new compact cars, the caster angle is not adjustable. On the 1985 Cadillac, Buick and Oldsmobile, the front wheel caster angle adjustment is difficult. The result is a higher cost of front end alignments because of the increased time the mechanic will need to make a proper caster adjustment; or more customer complaints about poor handling, oversteering, wandering, or wheel hop if the caster adjustment is not made properly.

The McPherson front suspension includes an elongated strut housing extending upwardly through a surrounding suspension spring. A bearing above the strut housing is attached to the underside of a strut mounting plate affixed to the frame of the vehicle. Caster angle is the angle between the axis of the strut and a vertical axis through the center of the wheel. If the strut requires a caster angle adjustment, the top of the strut housing can be moved laterally to change the strut angle. In the McPherson strut assemblies used in the 1985 Cadillac, Buick and Oldsmobile automobiles, this requires loosening the fasteners between the top of the strut assembly and the strut mounting plate, moving the top of the strut in a forward or backward direction to change the caster angle, and tightening the fasteners after the proper caster adjustment is set. However, the factory has not provided a simple means for making the caster adjustment. The 1985 instructional manual informs the mechanic to drill holes on opposite sides of a point at which the top of the strut assembly is attached to the strut mounting plate. The drilled holes then must be filed to form a long slotted hole that will allow the top of the strut assembly to slide relative to the fixed strut mounting plate to make the camber angle adjustment. No information is given on how to move the strut when making the caster angle adjustment. The strut can be moved by hammering on a punch for applying a pushing force to the top of the strut assembly, but this can damage the expensive strut assembly. A large amount of force is required to move the strut because of the weight of the strut assembly, and because the strut is moved against the weight of the vehicle. Moreover, the force must be applied at an awkward angle because of the elevation of a lip on the strut mounting plate which surrounds the top of the strut assembly. This also makes the strut position adjustment difficult.

The present invention provides a tool for making the caster angle adjustment in a McPherson front end suspension system of the type described above.

SUMMARY OF THE INVENTION

Briefly, the invention provides a tool for adjusting wheel caster of a vehicle suspension system of the McPherson type having a strut extending upwardly to an upper bearing assembly releasably attached to a strut mounting plate rigidly affixed to the vehicle frame. The upper end of the strut extends through the bearing assembly and into an opening in the mounting plate. The upper end of the strut is held to the bearing assembly by a strut fastener tightened against a bearing plate in pressure contact with the top of the bearing assembly. The strut fastener and bearing plate are exposed in the opening within the strut mounting plate. Fasteners for attaching the bearing assembly to the mounting plate can be loosened so that upper end of the strut and its bearing assembly can be moved relative to the strut mounting plate for adjusting the caster angle of the strut. The caster adjustment tool includes a ring for extending around the fastener that attaches the upper end of the strut to the upper bearing assembly. The ring rests on the upper bearing plate as the ring encompasses the strut fastener. A rigid force arm extends laterally away from a side of the ring for attachment to a lower portion of an elongated rigid lever arm. The force arm pivots about an axis through the lower portion of the lever arm. A connector on the lower portion of the lever arm is spaced from the pivot axis of the force arm. The connector is adapted for engagement with a region of the strut mounting plate adjacent the upper strut bearing. By fitting the ring around the strut fastener on the bearing plate at the top of the strut, and by engaging the connector on the lever arm with the adjacent portion of the rigid mounting plate, a force applied to the upper end of the lever arm in a direction generally parallel to the axis of the force arm applies leverage to the force arm. This moves the force arm and the ring against the side of the strut fastener for moving the top of the strut relative to the strut mounting plate for adjusting the caster angle. Appropriate gauges can be used to measure the caster angle as the strut position is adjusted. When the proper caster angle is set, the upper strut bearing assembly then can be rigidly fastened to the strut mounting plate to hold the set caster angle.

The caster adjustment tool also includes means for adjusting the length of the force arm so that leverage can be applied to the strut assembly in either direction, independently of the distance from the strut fastener to the point on the mounting plate from which the leverage is applied. This allows the tool to rapidly adjust positive or negative caster angle. In one embodiment, the ring and force arm have a releasable connection so that rings of different sizes and configurations can be used in the same tool to adapt to different McPherson upper bearing configurations.

These and other aspects of the invention will be more fully understood by referring to the following detailed description and the accompanying drawings.

DRAWINGS

FIG. 1 is a side elevation view showing a caster adjustment tool according to principles of this invention.

FIG. 2 is a top view, partly in cross-section, taken on line 2—2 of FIG. 1.

FIG. 3 is a fragmentary elevation view taken on line 3—3 of FIG. 1.

FIG. 4 is a diagram illustrating positive and negative front wheel caster angle adjustments.

DETAILED DESCRIPTION

Figure 5:
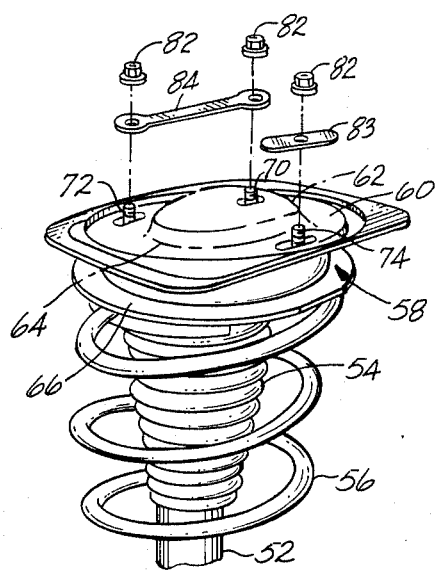
FIG. 5 is a fragmentary exploded perspective view illustrating a McPherson front wheel suspension system for which the tool is used to adjust the caster angle.

A caster adjustment tool 10 includes an elongated rigid lever arm 12 with a handle 14 at its upper end. The lever arm is made from a flat metal bar of narrow rectangular cross-section. The lower end of the bar has a taper 16 for narrowing the width of the bar above a narrow lower end portions 18 of the lever arm of reduced width and uniform rectangular cross-section from the end of the taper 16 to a bottom edge 20 of the lever arm.

A rigid cylindrical ring 22 is carried on the narrow lower portion 18 of the lever arm 12. The ring has a thin wall, illustrated best in FIG. 2, with a large circular open area within the interior of the ring. The ring also has a substantial height, as shown best in FIGS. 1 and 3, with the height of the ring being on the same order as its inside diameter.

An elongated force arm 24 fastens the ring 22 to the lower portion 18 of the lever arm 12. The force arm 24 is adjustable in length for adjusting the distance between the ring 22 and the bottom of the lever arm. In the illustrated embodiment, the force arm 24 includes an elongated externally threaded rigid shaft 26 rigidly affixed to the exterior sidewall of the ring 22. As shown best in FIG. 1, the threaded shaft 26 is affixed to the ring at a point about two-thirds the ring height above the base of the ring. Thus, most of the height of the ring can extend below the threaded shaft 26, as shown best in FIG. 1. The force arm 24 also includes an elongated rigid carrier arm 28 for fastening to the shaft 26 at one end and for pivoting to the lower portion of the lever arm at its opposite end. The carrier arm 28 comprises a rigid cylindrical metal sleeve having an internally threaded section 30 at the end remote from the lever arm, and a pair of flanges 32 for extending around opposite sides of the lower portion 18 of the lever arm. A transverse pivot pin 34 pivots the flanged sides of the carrier arm to the lower portion of the lever arm. The threaded shaft 26 on the ring 22 is threaded into the internally threaded passage 30 in the free end of the carrier arm 28. By rotating the ring about the axis of the shaft 26, the shaft can travel into or out of the sleeve provided by the threaded portion 30 of the carrier arm 28. This allows the effective length of the force arm 24 to be adjusted to move the ring closer to or farther away from the lower portion of the lever arm. The threaded connection between the sleeve portion of the carrier arm and the shaft 26 makes the adjustable-length force arm 24 rigid axially for all adjusted lengths. The distance of travel over which the position of the ring can be adjusted can be about one inch long. The threaded connection between the shaft and the carrier arm also makes it possible to remove the ring from the carrier arm and replace it with another ring of different size or configuration. The pivotal attachment of the force arm to the lower portion of the lever arm enables the lever arm to rotate about an axis through the pivot pin 34 toward the ring, as illustrated by the arrow shown in phantom lines at 36 in FIG. 1.

The edge of the lever arm which faces away from the ring 22 has a recess 38 extending into it a short distance above the bottom edge 20 of the lever arm. The recess 38 is spaced a short distance below the bottom edges of the flanges 32 on the carrier arm 28, so that the recess is spaced below the pivot axis through the pivot pin 34.

Thus, the force arm 24 extends along an axis 40 perpendicular to the upright edge of the ring 22 and perpendicular to the upright axis through the center of the ring. Moreover, the arc through which the lever arm can swing, when rotated about the axis through the pivot pin, extends in the same vertical plane as the axis 40 of the force arm.

The caster adjustment tool 10 is used to apply leverage to the upper end of a McPherson strut assembly to change the angle at which the strut is mounted to the vehicle. This changes the caster angle of the strut. FIG. 4 illustrates a typical caster adjustment in which a left side view of a wheel 44 is shown in diagram form. A vertical axis 46 extends through the centerline of the wheel. An axis 48 represents the axis along which the McPherson strut arm extends. This axis extends through the center of the wheel at an angle to the vertical axis 46. The angle 50 between these two axes represents a positive caster angle, an angular rotation of the strut away from the front of the vehicle. If the axis of the strut is rotated toward the front of the vehicle, to the opposite side of the vertical axis 46, then the strut is set at a negative caster angle.

FIG. 5 is an exploded perspective view of a McPherson front wheel suspension assembly for 1985 Cadillac, Buick and Oldsmobile front wheel drive automobiles. This suspension assembly includes a McPherson strut arm 52, a tapered bellows-type housing 54 surrounding a shock absorber in the upper portion of the McPherson strut, a suspension spring 56 through which the upper portion of the strut and its housing extend, an upper bearing assembly 58 at the upper end of the strut arm, and a strut mounting plate 60 to which the bearing assembly is attached. The upper end of the bearing assembly is protected by a flexible boot 62 shown in phantom lines in FIG. 5. The boot is removed when making the caster adjustment. This leaves the upper end of the bearing assembly exposed in an opening 64 in the strut mounting plate 60. A raised lip extends around the opening 64 (shown best in FIG. 5). The bearing assembly includes a circular plate 65 having a raised annular outer rim 66 for confining the circular upper end of the coil spring 56. A rigid plate 68 is rigidly affixed to the top of the plate 65 which fits over the top of the coil spring. The plate 66 carries three upwardly extending externally threaded bolts 70, 72 and 74 for fastening the bearing assembly 58 to the underside of the strut mounting plate 60. The thread bolts 70, 72 and 74 are rigidly affixed to the upper face of the fastener mounting plate 68 which is positioned immediately below and parallel to the underside of the strut mounting plate 60. The mounting plate 60 is rigidly affixed to the vehicle body. The upper bearing assembly 58 is attached to this fixed plate 60 by an adjustable connection which allows the bearing assembly to be moved relative to the mounting plate 60 for adjusting the caster angle of the strut 52. The caster adjustment is made possible by elongated slotted holes 76, 78 and 80 in the plate 60 through which the bolts 70, 72 and 74 extend, respectively. A separate nut 82 on each of the bolts can be loosened to allow the fasteners for the upper bearing assembly of the strut to move back and forth in the slotted holes when the caster angle is being adjusted. Once the caster angle is set, each nut 82 can be tightened against the upper face of washers 83 and 84 on the strut mounting plate 60 to hold the set caster angle.

Figure 6:
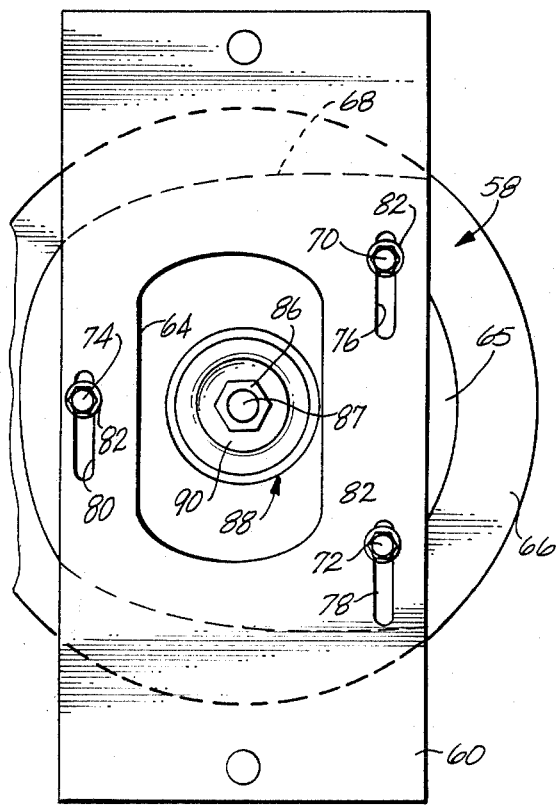
FIG. 6 is an elevation view showing means for connecting the top of the McPherson strut and its bearing assembly to the underside of a strut mounting plate on the vehicle.
Figure 7:
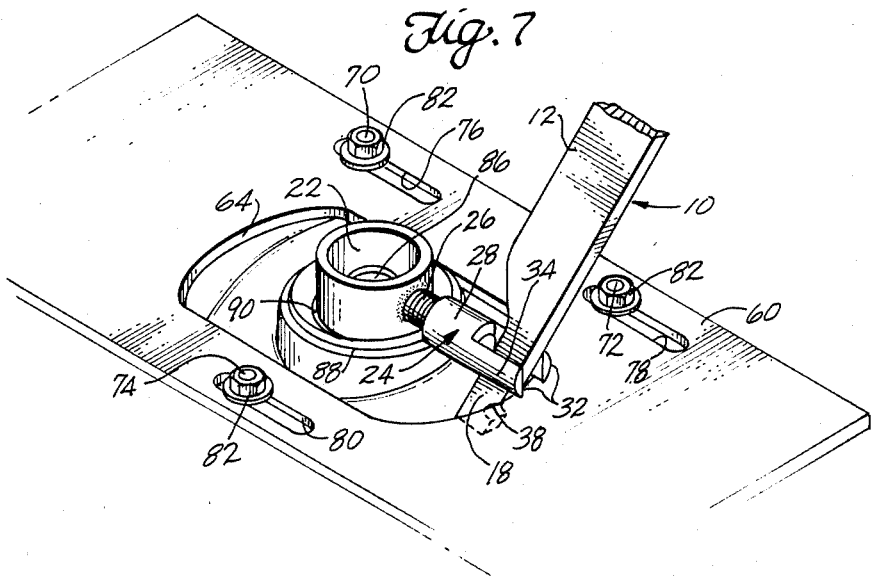
FIG. 7 is a perspective view illustrating use of the caster adjustment tool of this invention.

Use of the camber adjustment tool 10 is understood best by referring to FIGS. 6 and 7. The McPherson front suspension system for the 1985 Cadillac, Buick and Oldsmobile requires modification by the mechanic before caster angle can be adjusted. The slotted hole 78 does not exist on these model automobiles. That hole is not oversized but is circular to just allow sufficient clearance for passage of the bolt 72. This prevents the strut bearing assembly from moving relative to the plate 60, unless modified. The instructional manual for these automobiles simply indicates that the nut 82 should be removed from the bolt 72, the washer 84 should be removed, and the hole in the plate 60 through which the bolts 72 extends should be lengthened by drilling holes on opposite sides of the bolt and filing out the hole to make it the same length as the other slotted holes 76 and 80. The instructional manual then does not give any further indication on how to set the caster angle. Conventionally, this can be done by applying force to the top of the bearing assembly by hammering on a punch to force the top of the bearing assembly in either direction parallel to the long holes 76, 78 and 80. However, the combined weight of the strut assembly and of the vehicle, against which the strut must be moved, requires a substantial amount of force. Hammering on the top of the strut bearing with the required force can damage the bearing assembly or the shock absorber at the upper end of the strut. The angle at which the force must be applied, because of the surrounding lip on the mounting plate, adds to the difficulty. Hammering on the bearing assembly with periodic impacts also makes it difficult to accurately set the proper caster angle under these circumstances.

The caster adjustment tool 10 can be used to easily set the caster angle. The ring 22 is first placed over a fastener 86 which secures the upper end of the strut 52 to the upper bearing assembly 58. This attachment is actually made by the fastener 86 being threaded onto an externally threaded upper end of the shock absorber rod 87. The fastener 86 is tightened against a bearing plate 88 which fits around the upper end of the shock absorber rod 87. The bearing plate is circular and has a recessed upper face, leaving a flat narrow annular upper face 90 inside the bearing plate surrounding the fastener 86. The ring 22 of the caster adjustment tool is placed inside the bearing plate 88 so the bottom annular edge of the ring rests against the annular upper face 90 of the bearing plate which surrounds the fastener 86. The recess 38 at the bottom of the lever arm 12 is then engaged with the edge of the opening 64 in the strut mounting plate 60 on a side of the opening away from which the strut will be moved in making the caster angle adjustment. The ring 22 and shaft 26 can be rotated relative to the carrier arm 28 to adjust the length of the force arm 24 to match the distance between the strut fastener 86 and the edge of the opening 64 in the plate 60. The adjusted length of the force arm allows the lever arm to be tilted at an angle extending upwardly and away from the ring, as shown in FIG. 7.

The height of the ring is sufficient to allow the force to extend over the peripheral lip of the bearing plate 88 so that the force arm 24 extends generally parallel to the upper face of the mounting plate 60, and therefore, generally perpendicular to the vertical axis through the fastener 86 and the top of the strut. When applying a force on the end of the lever arm in a direction toward the connection of the ring to the strut fastener 86, reverse rotation of the bottom of the lever arm 12 about the axis of the pin 34 is resisted by the rigidity of the mounting plate 60 acting at its point of engagement with the recess 38 at the bottom of the lever arm. The pivot through the pivot pin 34 allows the lever arm to rotate forward through an angle to apply a resultant caster adjustment force in a horizontal direction against the side of the strut fastener 86 through the connection provided by the surrounding ring 22. This force is spread around the region of the fastener by force also being applied to some extent against the face of the bearing plate 88 by the ring 22. The caster adjustment force is applied principally along the axis 40 in the direction of the arrow 94 shown in FIG. 2. This force applied against the upper end of the strut bearing assembly is continuous and moves the top of the strut sideways in a progressive manner. The strut is able to travel relative to the fixed plate 60 as the bolts 70, 72 and 74, slide lengthwise in the slotted openings 76, 78 and 80, respectively. When the caster angle gauge (not shown) indicates the correct caster angle setting, each nut 82 is tightened against the upper face of the strut mounting plate 60 to hold the strut at the proper caster angle.

The caster adjustment tool can be easily used to make positive or negative caster adjustments. The tool can be used from either side of the opening 60 surrounding the upper strut bearing. The ring 22 can be rotated relative to the sleeve 28 to adjust the length of the force arm 24 to match any distance between the upper bearing fastener 86 and the edge of the opening 64 against which the force is applied for making the caster adjustment. Thus, the tool can be used to move the upper end of the strut in one direction, and if the gauge measurement indicates that the angle was overcorrected, the tool can be quickly adjusted and the caster adjustment made in the opposite direction to correct the caster angle setting.

I claim:

1. A caster adjustment tool for making a caster angle adjustment on a McPherson front end suspension system having a strut arm with a strut fastener securing the strut to an upper bearing assembly, in which the upper bearing assembly is releasably attached to a strut mounting plate rigidly affixed to the vehicle frame so that the upper bearing assembly can be moved relative to the strut mounting plate to adjust the caster angle of the strut, the caster adjustment tool comprising:

an elongated lever arm, a ring for extending around the strut fastener, a rigid force arm extending from the ring toward a lower portion of the lever arm, pivot means pivotally securing the end of the force arm opposite the ring to the lower portion of the lever arm so that the lever arm pivot about an axis through the pivot means to rotate toward the ring in a direction generally aligned with the axis of the force arm, and connecting means on the lower portion of the lever arm spaced from the pivot axis and positioned on a side of the lever arm opposite from the ring for engagement with a portion of the strut mounting plate adjacent the strut fastener, the connecting means being engaged with the mounting plate with the ring extending around the strut fastener so that force applied to the lever arm rotates it toward the ring by pivoting the arm about the pivot axis while the mounting plate resists the force applied to it by the engaged lever arm to move the force arm and ring toward the side of the strut fastener to move the upper strut bearing assembly relative to the strut mounting plate to adjust the caster angle of the strut.

2. Apparatus according to claim 1 in which the connecting means comprises a recess in an edge of the lever arm, and the recess is spaced below the pivot axis.

3. Apparatus according to claim 2 including means for releasably securing the ring to the force arm to adjust the length of the force arm and rigidly hold the force arm at the adjusted length.

4. Apparatus according to claim 1 including means for releasably securing the ring to the force arm to adjust the length of the force arm and rigidly hold the force arm at the adjusted length.

5. A method for making a caster angle adjustment in a McPherson front end suspension system having a McPherson strut arm, an upper bearing assembly secured to the upper end of the strut arm, means releasably securing the bearing assembly to a strut mounting plate rigidly affixed to the body of the vehicle, in which the position of the bearing assembly can be adjusted relative to the mounting plate to adjust the caster angle of the strut, the upper end of the strut being secured to the bearing assembly by a strut fastener tightened against the bearing assembly, and in which the strut fastener and bearing plate are exposed in an opening in the strut mounting plate, the camber adjustment method comprising the steps of:

placing a rigid ring around the upper bearing fastener, engaging a lower portion of a rigid lever arm with an edge of the mounting plate opening adjacent the strut fastener, providing a rigid force arm between a lower portion of the lever arm spaced from the connection to the mounting plate and the ring, providing a means of pivoting the force arm to the lower portion of the lever arm spaced from the connection of the lever arm to the mounting plate, and applying force to the lever arm in a direction toward the ring to move the force arm and ring toward the fastener to cause the ring to apply force against the side of the fastener as the force is resisted by the connection between the lower end of the lever arm and its rigid connection to the mounting plate so that the applied force moves the upper bearing assembly of the strut relative to the strut mounting plate to adjust the caster angle of the strut.

* * * * *